(No Model.)

D. McCREADY.
THILL COUPLING.

No. 447,786.  Patented Mar. 10, 1891.

Witnesses

Inventor
David McCready
By his Attorney
Thomas E. Barrow

United States Patent Office.

DAVID McCREADY, OF PERRYSVILLE, OHIO.

THILL-COUPLING.

SPECIFICATION forming part of Letters Patent No. 447,786, dated March 10, 1891.

Application filed May 27, 1890. Serial No. 353,301. (No model.)

*To all whom it may concern:*

Be it known that I, DAVID MCCREADY, a citizen of the United States of America, residing at Perrysville, in the county of Ashland and State of Ohio, have invented certain new and useful Improvements in Thill-Couplings, of which the following is a specification, reference being had therein to the accompanying drawings.

My invention relates to improvements in couplings which, while especially adapted for use as thill-couplings, may be employed as a pitman-coupling, or, in fact, be used in any situation where it would serve the desired purpose.

The object of my invention is the provision of a coupling which can be easily and quickly applied and detached and which shall be the embodiment of simplicity, durability, and cheapness.

A further object of my invention is the provision of a coupling which will allow the proper movement of the parts, but which will entirely prevent any rattling, and which can be adjusted to take up the wear occasioned by the use of the coupling.

The invention consists of the novel and improved construction of coupling, substantially as herein illustrated, described, and definitely defined and distinguished by the claims.

Figure 1:
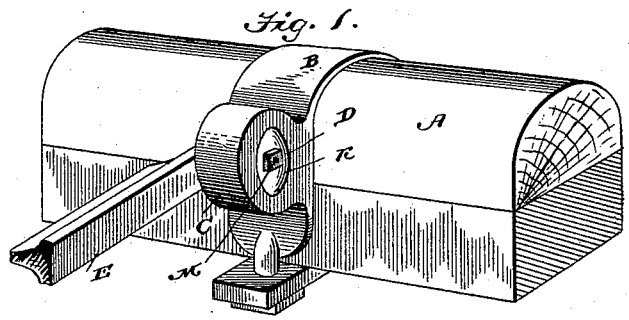
Figure 2:
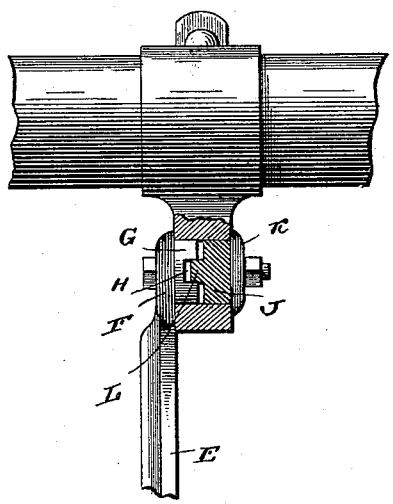
Figure 3:
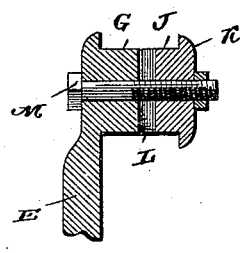

Figure 1 represents a perspective view of a thill-coupling constructed in accordance with and embodying my invention. Fig. 2 represents a top plan view, partly in section, of the same; and Fig. 3 represents a sectional view of a part thereof.

Referring by letter to the drawings, A designates the axle, and B the clip secured thereon, which is formed with a disk or lug C, provided with an aperture or opening D. The draw-iron or shackle E is formed at its end with a disk F, having the curved lug or boss G, provided on its inner face with a channel or groove H, and the curved boss is perforated and fits in one side of the opening D of the lug, and in the other side fits the curved perforated and threaded lug or boss J, formed with the flange or disk K and having the rib L, which fits in the channel or groove H, and thus the two curved bosses are connected together and form a pivot in the lug. Through the aperture of the bosses passes the bolt M, securely clamping the disks in place in the lug and serving to take up the wear.

From the foregoing description and drawings it will be seen that the two flanged bosses are secured together and allow the draw-irons to have the proper movement when in use, will prevent rattling of the parts, can be easily detached and replaced, are of simple and cheap construction, and thoroughly efficient. It will also be seen that a coupling constructed as shown and described can be used in other places and be effective.

I do not wish to be limited to the exact construction and arrangements shown, as they may be somewhat varied without departing from the spirit of the invention.

I claim as my invention—

1. In a coupling, the combination of the clip, the apertured curved bosses pivoted in said clip and connected by a rib and groove, and a bolt for securing the bosses in engagement, substantially as described.

2. In a coupling, the combination of a clip having the apertured lug, the draw-iron having the disk formed with a curved lug having a channel, the disk having a curved lug formed with a rib fitting in the channel of the other boss or lug, the two lugs or bosses fitting in the apertured lug on the clip, and a bolt passing through the curved lugs for securing the bosses in engagement, substantially as described.

3. In a coupling, the combination of a shackle composed in two parts, having a lock on the inner face and connected together by a bolt, one of the parts having a threaded orifice and a nut to lock the said threaded part on the bolt, substantially as shown and described.

In testimony whereof I affix my signature in presence of two witnesses.

DAVID McCREADY.

Witnesses:
S. A. RINGLE,
S. G. CUMMINGS.